US007674543B2

(12) United States Patent
Chiang et al.

(10) Patent No.: US 7,674,543 B2
(45) Date of Patent: Mar. 9, 2010

(54) SOLID OXIDE FUEL CELL OF MULTIPLE TUBULAR ELECTRODES

(75) Inventors: Lieh-Kwang Chiang, Tainan (TW); Yu-Ching Tsai, Donggang Township, Pingtung County (TW); Chia-Lieh Huang, Hualien (TW); Wei-Ping Huang, Taipei (TW); Chien-Hsiung Lee, Longtan Township, Taoyuan County (TW)

(73) Assignee: Institute of Nuclear Energy Research Atomic Energy Council, Taoyuan County (TW)

( * ) Notice: Subject to any disclaimer, the term of this patent is extended or adjusted under 35 U.S.C. 154(b) by 1022 days.

(21) Appl. No.: 11/385,851

(22) Filed: Mar. 22, 2006

(65) Prior Publication Data

US 2007/0037028 A1 Feb. 15, 2007

(30) Foreign Application Priority Data

Nov. 8, 2005 (TW) ............................. 94139181 A

(51) Int. Cl.
*H01M 8/12* (2006.01)
*H01M 8/24* (2006.01)
(52) U.S. Cl. ............................. 429/31; 429/30; 429/32; 429/34; 429/38
(58) Field of Classification Search ................... 429/34, 429/31, 32, 30; 422/211, 188
See application file for complete search history.

(56) References Cited

U.S. PATENT DOCUMENTS

| 4,490,444 | A * | 12/1984 | Isenberg | 429/31 |
| 4,833,042 | A | 5/1989 | Waldrop et al. | 428/641 |
| 6,416,897 | B1 | 7/2002 | Tomlins et al. | 429/31 |
| 6,444,342 | B1 | 9/2002 | Doshi et al. | 429/31 |
| 6,468,480 | B1 * | 10/2002 | Clawson et al. | 422/211 |
| 2004/0258972 | A1 | 12/2004 | Du et al. | 429/31 |

FOREIGN PATENT DOCUMENTS

| EP | 1 467 427 A2 | 10/2004 |
| JP | 01267964 | 10/1989 |

(Continued)

OTHER PUBLICATIONS

English translation of JP 01-267964, Shimozu et al., Oct. 1989.*

*Primary Examiner*—Jonathan Crepeau
*Assistant Examiner*—Kenneth Douyette
(74) *Attorney, Agent, or Firm*—WPAT., P.C.; Justin King

(57) ABSTRACT

The present invention relates to a solid oxide fuel cell, which comprises: a plurality of tubular electrodes, reacting gases supplying means, and a preheat piping. The tubular electrodes are concentrically arranged while enabling the polarity of a surface of any one of the plural electrodes is the same as that of the corresponding surface of a neighbor electrode faced thereto; wherein each tubular electrode further comprises an anode layer, a cathode layer, and a solid electrolyte layer sandwiched between the anode layer and the cathode layer. The supplying reacting gases means is capable of supplying fuel and gas respectively to the anode and cathode of the tubular electrodes. The preheat piping, connected to the supplying reacting gases means, collects the heat generated from the combustion reaction of residual fuel and gas, which can be utilized to preheat the gases supplying reacting means.

18 Claims, 8 Drawing Sheets

FOREIGN PATENT DOCUMENTS

| | | | |
|---|---|---|---|
| JP | 01267964 A * | 10/1989 |
| JP | 01298647 | 12/1989 |
| JP | 03095869 | 4/1991 |
| JP | 08050914 | 2/1996 |
| JP | 2003123824 | 4/2003 |

\* cited by examiner

SOLID OXIDE FUEL CELL OF MULTIPLE TUBULAR ELECTRODES

FIELD OF THE INVENTION

The present invention relates to a fuel cell, and more particularly, to a compact solid oxide fuel cell of multiple tubular electrodes whose operating efficiency is improved by using the cooperation of the multiple tubular electrodes with corresponding connecting plates and the preheat piping arranged therein to reduce the internal impedance of the fuel cell.

BACKGROUND OF THE INVENTION

Fuel cells convert the chemical energy of fuels directly into electricity. The principle of the fuel cell was developed by William Grove in 1839. The alkaline fuel cell is one of the oldest and most simple type of fuel cell. This is the type of fuel cell that has been used in space missions since it first being developed at 1940. Since then, a variety of fuel cells had been development for all kinds of commercial usages. Among those, solid oxide fuel cells (SOFCs) are particularly attractive because they have the highest efficiencies of any conventional fuel cell design and the potential to use many fuels, including methane, without expensive external reformers that create more volatile chemicals. SOFCs can operate at high temperatures, producing high-grade waste heat, or exhaust, which can be recovered and used for other applications, such as space heating and cooling, supplying homes with hot water, and even generating extra electricity by spinning a gas turbine linked to the unit.

Conventionally, an SOFC is constructed with two porous electrodes which sandwich an electrolyte. In an SOFC, fuel, e.g. methane, and oxidant, e.g. air, are preheated to a temperature close to the operating temperature of the SOFC, i.e. between 600° C.~1000° C., and then being fed into the SOFC. When an oxygen molecule contacts the cathode/electrolyte interface as the air flows along the cathode (which is therefore also called the "air electrode"), it catalytically acquires four electrons from the cathode and splits into two oxygen ions. The oxygen ions diffuse into the electrolyte material and migrate to the other side of the cell where they encounter the anode (also called the "fuel electrode"). The oxygen ions encounter the fuel at the anode/electrolyte interface and react catalytically, giving off water, carbon dioxide, heat, and—most importantly—electrons. The electrons transport through the anode to the external circuit and back to the cathode, providing a source of useful electrical energy in an external circuit. Furthermore, the exhaust air with temperature higher than 700° C. and residual fuel, both being discharged at the exit of the SOFC, can be recycled for other usages.

Two possible design configurations for SOFCs have emerged: a planar design and a tubular design. Since the planar SOFCs are troubled by the difficulty of keeping airtight, tubular SOFC had been developed starting from 1960 by Westinghouse Electric Corp as disclosed in U.S. Pat. Nos. 4,490,444, 4,833,042, 6,416,897 and 6,444,342. In the tubular SOFC, components, i.e. the fuel electrode, the electrolyte and the air electrode, are assembled in the form of a hollow tube so that the tabular SOFC can keep good airtight even when subjecting to a high-temperature ambient even at 1000° C., but is suffered by the problems of high fabrication cost due to the complicated process required to manufacture the same and high internal impedance due to the path of current generated thereby is comparatively longer. Since the voltage output of a single tubular fuel cell is far to low for many applications, it frequently becomes necessary to connect multiple tubular fuel cells in series, parallel or series/parallel configuration while arranging the plural tubular fuel cells neighboring to each other as those disclosed in US. Pat. No. 4,490,444. However, as the increase of output voltage, the overall volume of the assembly of the plural tabular cells is increase that might not be a good idea in the usage point of view. It is noted that tubular designs have a drawback of low volumetric power packing density. In other words, in order to generate an equivalent amount of power, a tubular fuel cell is generally much larger in size than a planar fuel cell.

Although, a space-saving tubular SOFC with assembly of concentrically arranged electrodes had already been disclosed in U.S. patent application No. 2004/0258972, which is advantageous in that the size of the space-saving tubular SOFC of U.S. patent application No. 2004/0258972 is significantly smaller than other stacked designs, it is still lack of functions of fuel recycling, gas preheating and modularization.

Therefore, it is in great need to have a compact solid oxide fuel cell module that is free from the problems of conventional fuel cells, but still keeps all the benefits that conventional fuel cells have.

SUMMARY OF THE INVENTION

In view of the disadvantages of prior art, the primary object of the present invention is to provide a solid oxide fuel cell of multiple tubular electrodes, which is substantially a fuel cell having a plurality of tubular electrodes, being concentrically arranged in a space formed in the fuel cell, and thereby enabling the same to have a comparatively higher power output per unit volume.

It is another object of the present invention to provide a solid oxide fuel cell of multiple tubular electrodes capable of shortening the traveling path of current generated thereby by the arrangement of connecting plates at peripheries of tubular electrodes, and thus reducing the internal impedance thereof It is yet another object of the present invention to provide a solid oxide fuel cell of multiple tubular electrodes, capable of being employed as one power generating unit so as to form a fuel cell module by combining a plurality of the power generating units in a modularized design for enables the formed fuel cell module to incorporate any amount of fuel cells therein with flexible formation while enabling each fuel cell of the formed fuel cell module to be maintained and replaced with ease.

It is further another object of the present invention to provide a solid oxide fuel cell of multiple tubular electrodes, which has a preheat piping to be arranged at a place corresponding to the piping of the fuel cell for supplying air and fuel thereto, so that the air and the fuel required by the fuel cell can be preheated before each being fed into its designated area of reaction in the fuel cell.

To achieve the above objects, the present invention provides a solid oxide fuel cell, which comprises:

- a plurality of tubular electrodes, being concentrically arranged to form a plurality of reaction chambers therebetween while enabling the polarity of a surface of any one of the plural electrodes to be the same as that of the corresponding surface of a neighbor electrode faced thereto, each tubular electrode being comprised of an anode layer, a cathode layer, and a solid electrolyte layer sandwiched between the anode layer and the cathode layer;

a reacting gases supplying means, capable of supplying a fuel and a gas respectively to the anode and cathode of each tubular electrode; and a preheat piping, connected to the reacting gases supplying means, for collecting the heat generated from the combustion reaction of residual fuel and gas to preheat the fuel and gas inside the reacting gases supplying means.

Preferably, the reacting gases supplying means further comprises: a gas pipe, being arranged in the space enclosed by the inner most tubular electrode of the plural concentric-arranged tubular electrodes, having at least a hole arranged on the pipe wall thereof at a position corresponding to each reaction chamber formed between two cathode layers respectively of two adjacent tubular electrodes for enabling the gas flowing therein to flow into the referring reaction chamber by way of each corresponding hole; and a fuel pipe, being arranged in the space enclosed by the inner most tubular electrode of the plural concentric-arranged tubular electrodes, having at least a hole arranged on the pipe wall thereof at a position corresponding to each reaction chamber formed between two anode layers respectively of two adjacent tubular electrodes for enabling the fuel flowing therein to flow into the referring reaction chamber by way of each corresponding hole.

Preferably, each tubular electrode further comprises at least a pair of connecting plates, respectively connected to the cathode layer and the anode layer of the referring tubular electrode while enabling one connecting plate of the pair to be disposed at a place of the referring tubular electrode corresponding to that of another connecting plate of the pair.

In a preferred embodiment of the invention, each tubular electrode further comprises two pairs of connecting plates, wherein the two connecting plates of one pair out of the two pairs are respectively connected to the cathode layer and the anode layer of the referring tubular electrode while enabling one connecting plate of the pair to be disposed at a first position of the referring tubular electrode corresponding to that of another connecting plate of the pair; and the two connecting plates of another pair are respectively connected to the cathode layer and the anode layer of the referring tubular electrode while enabling one connecting plate of the pair to be disposed at a second position of the referring tubular electrode corresponding to that of another connecting plate of the pair.

Preferably, a connecting plate connecting to the anode layer of one of the plural tubular electrodes is electrically connected to a connecting plate connecting to the cathode layer of a tubular electrode neighboring to the referring one.

Preferably, the fuel cell of the invention further comprises an exhaust pipe for discharging the exhaust generated by the combustion reaction of the fuel cell.

Preferably, the preheat piping is a helical pipe.

To achieve the above objects, the present invention provides a fuel cell module, comprising:

a plurality of power generating units, being arranged inside a hull, each power generating unit further comprising:

a plurality of tubular electrodes, being concentrically arranged in a housing of the referring power generating unit to form a plurality of reaction chambers therebetween while enabling the polarity of a surface of any one of the plural electrodes to be the same as that of the corresponding surface of a neighbor electrode faced thereto, each tubular electrode being comprised of an anode layer, a cathode layer, and a solid electrolyte layer sandwiched between the anode layer and the cathode layer; and a reacting gases supplying means, capable of supplying a fuel and a gas respectively to the anode and cathode of each tubular electrode;

at least two first current collectors, being arranged inside the hull for fixing the plural power generating units; and a plurality of preheat pipings, respectively connected to the reacting gases supplying means of each power generating unit for collecting the heat generated from the combustion reaction of residual fuel and gas to preheat the fuel and gas inside the corresponding reacting gases supplying means.

Preferably, the fuel cell module further comprises at least a second current collector, each being arranged inside the hull while electrically connecting to the cathode layer of each tubular electrode as each first current collector is an anode plate.

Preferably, the fuel cell module further comprises at least a second current collector, each being arranged inside the hull while electrically connecting to the anode layer of each tubular electrode as each first current collector is a cathode plate.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1A:
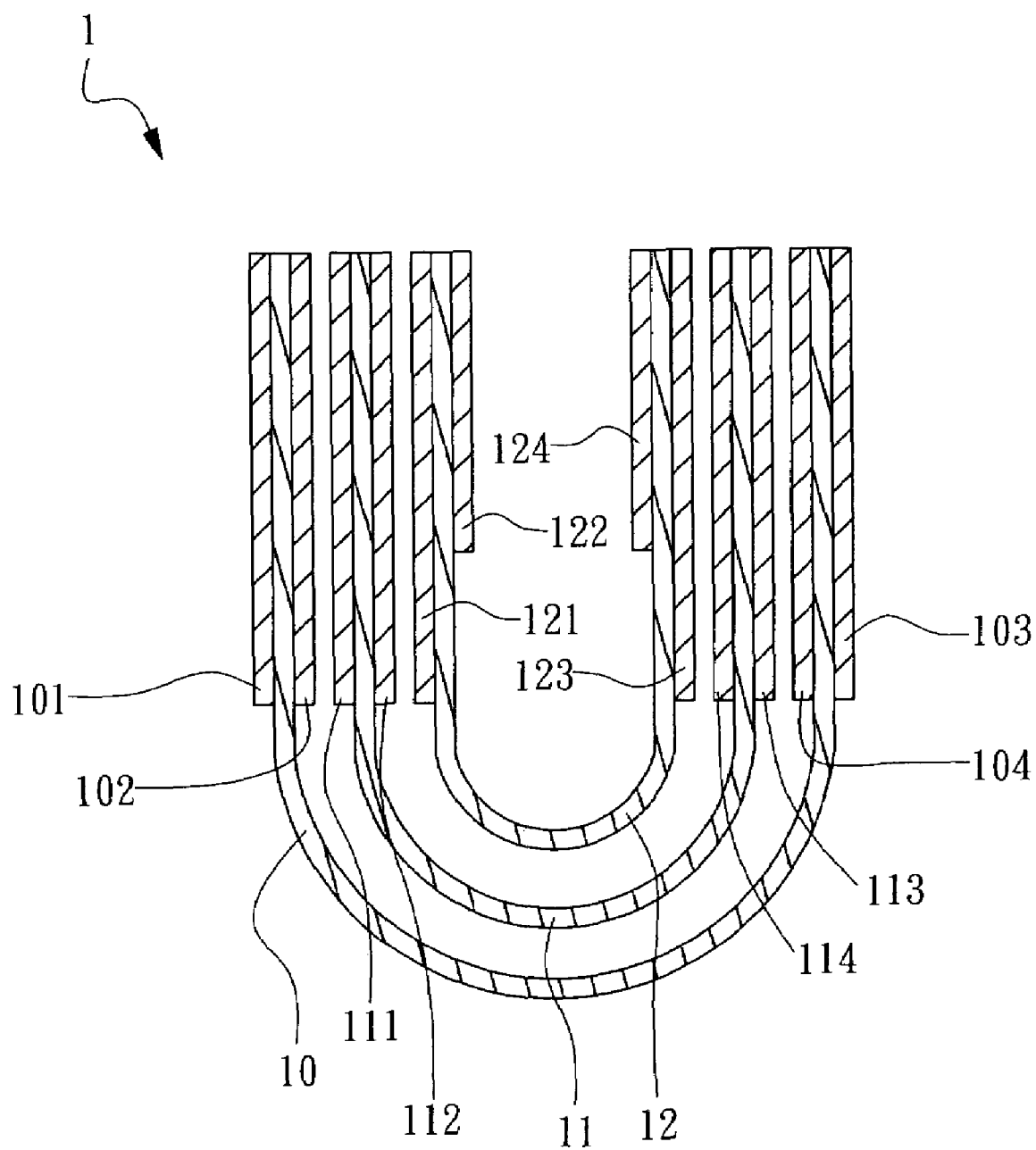
FIG. 1A is a sectional view of the plural concentric-arranged tubular electrodes of a solid oxide fuel cell according to a preferred embodiment of the invention.
Figure 1B:
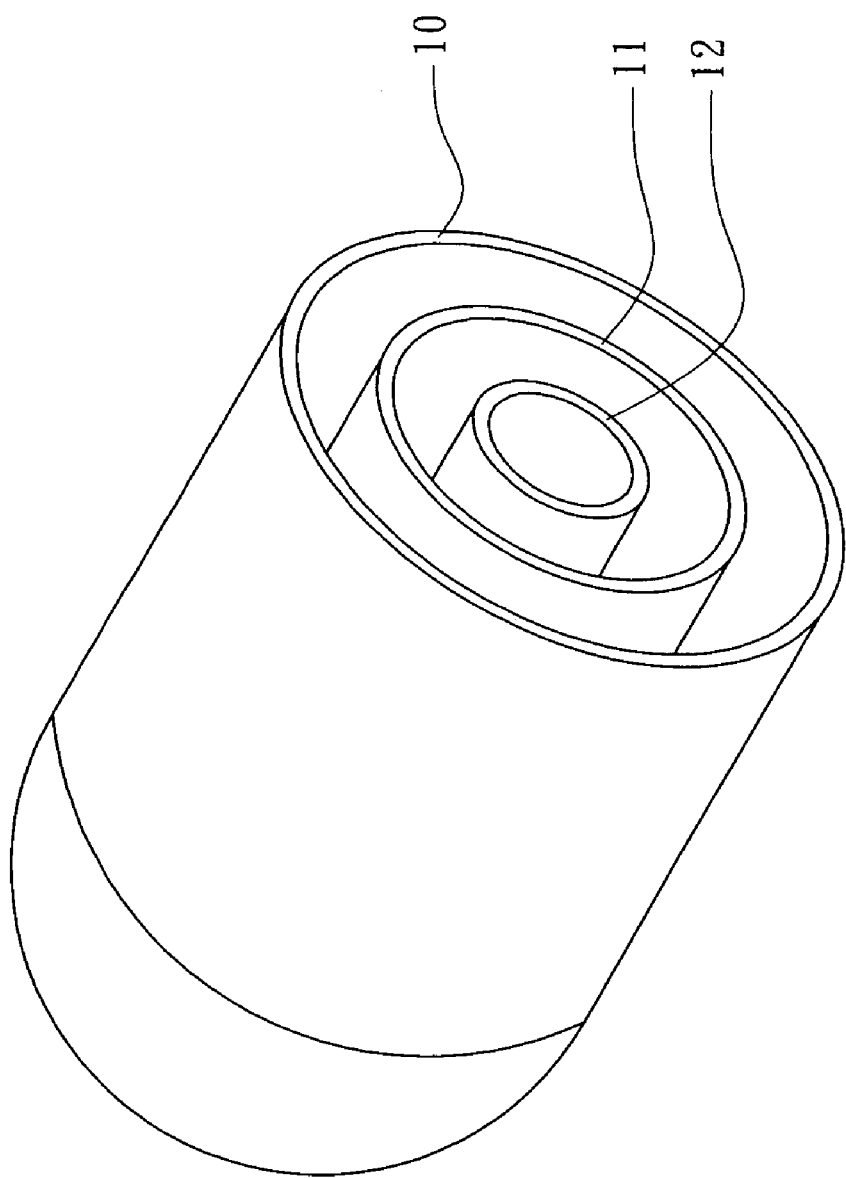
FIG. 1B is a three-dimensional diagram showing the assembly of a plurality of concentric-arranged tubular electrodes according to the present invention.

Please refer to FIG. 1A and FIG. 1B, which are respectively a sectional view of the plural concentric-arranged tubular electrodes of a solid oxide fuel cell and a three-dimensional diagram showing the assembly of a plurality of concentric-arranged tubular electrodes according to a preferred embodiment of the present invention. The electrode structure 1 of a solid oxide fuel cell of the invention is comprised of a plurality of tubular electrodes, being concentrically arranged to form a plurality of reaction chambers therebetween while enabling the polarity of a surface of any one of the plural electrodes to be the same as that of the corresponding surface of a neighbor electrode faced thereto. In this preferred embodiment, there are three concentric-arranged tubular electrodes, i.e. the first tubular electrode 11, the second tubular electrode 12 and the third tubular electrode as shown in FIG. 1A, being assembled in the electrode structure 1, whereas the three the first tubular electrode 10, the second tubular electrode 11 and the third tubular electrode 12 are concentrically arranged in a formation that the second tubular electrode 11 is sandwiched between the first tubular electrode 10 and the third tubular electrode 12. It is noted that the power output per unit volume of the fuel cell can be reduced by the formation of the concentric-arranged tubular electrodes therein.

Figure 1C:
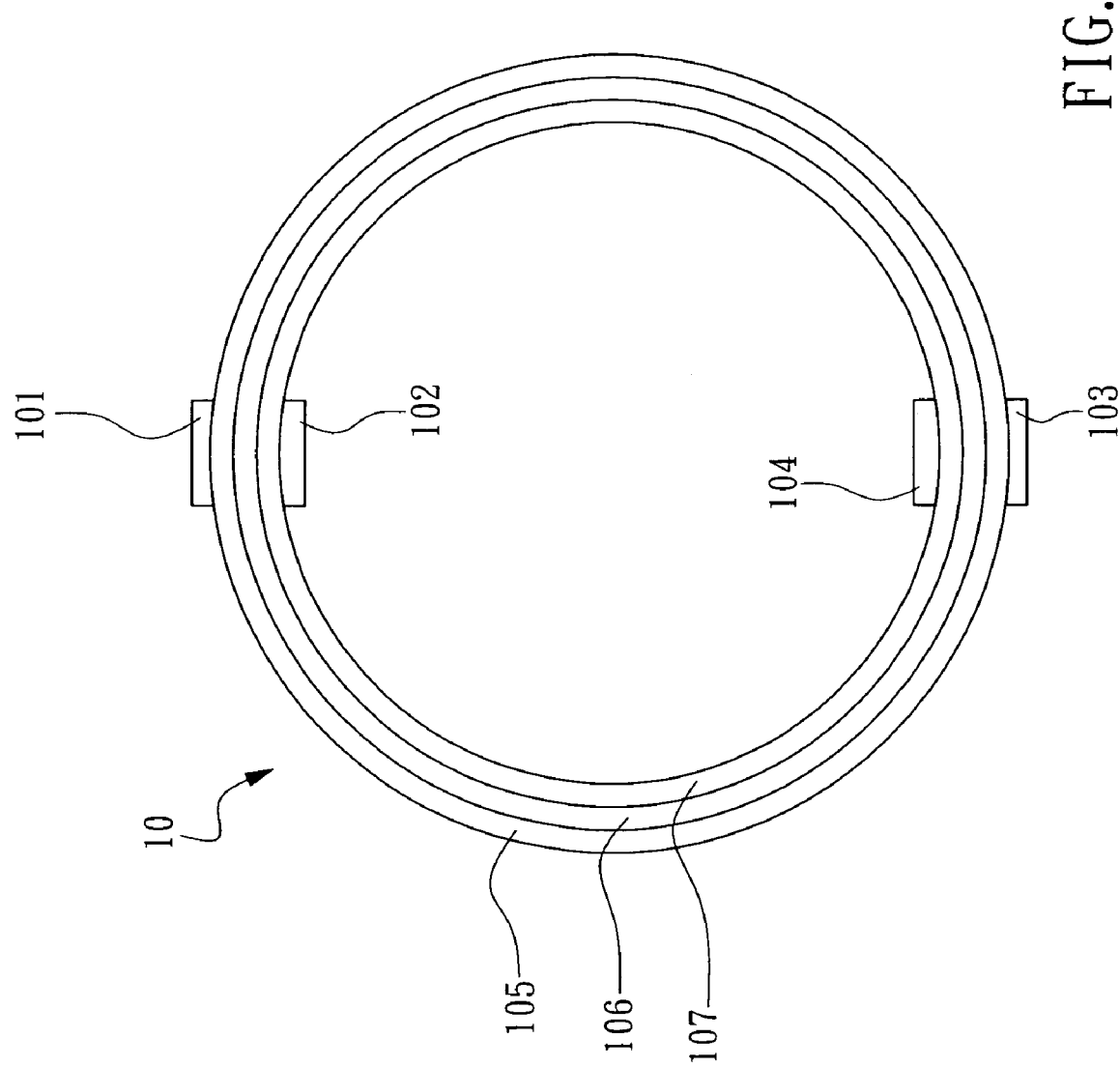
FIG. 1C is a top view of a tubular electrode selected from the plural concentric-arranged tubular electrodes of a solid oxide fuel cell according to the present invention.
Figure 5:
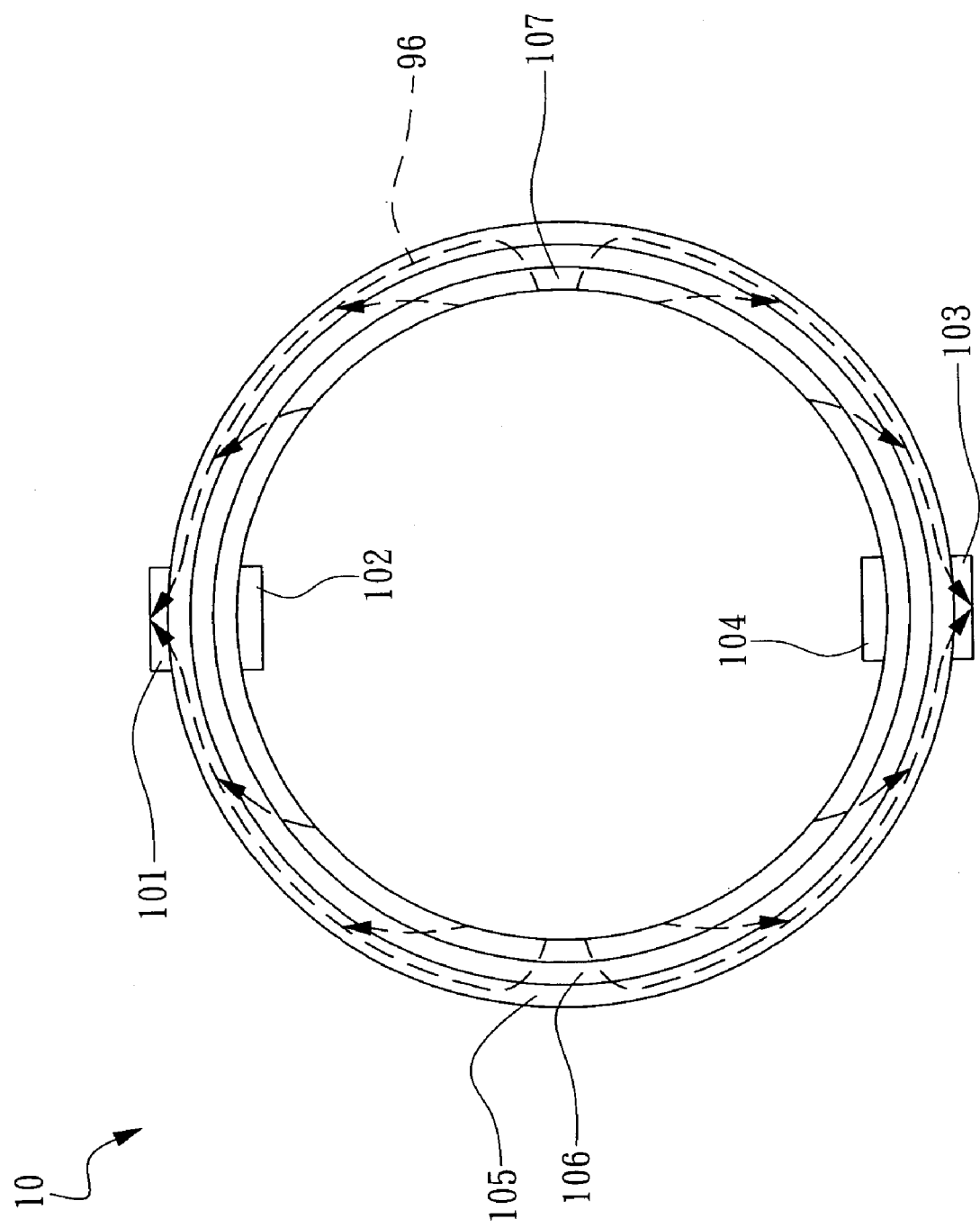
FIG. 5 is a schematic diagram depicting a traveling path of current generated by a solid oxide fuel cell of the present invention.

Please refer to FIG. 1C, which is a top view of the first tubular electrode 10 of FIG. 1A. It is known that the configurations of all tubular electrodes being arranged in a fuel cell of the invention is the same and thus the first tubular electrode 10 shown in FIG. 1C can be used as the representative of the plural concentric-arranged tubular electrodes. The first tubular electrode 10 is comprised of an anode layer 105, a cathode layer 107, and a solid electrolyte layer 106 sandwiched between the anode layer 105 and the cathode layer 107. In this preferred embodiment, the anode layer 105 is disposed at the outer most layer while the cathode layer 107 is disposed at the inner most layer, however, the configuration of the first tubular electrode 10 is not limited thereby and can be constructed with the anode layer 105 to be disposed at the inner most layer. Moreover, there are two pairs of connecting plates 101, 102, 103, 104 to be connected to the first tubular electrode 10, whereas the two connecting plates of one pair out of the two pairs, i.e. the two connecting plates 101, 102, are respectively connected to the anode layer and the cathode layer of the first tubular electrode 10 while enabling the connecting plate 101 to be disposed at a first position of the first tubular electrode corresponding to that of another connecting plate 102; and the two connecting plates 103, 104 of another pair are respectively connected to the anode layer 105 and the cathode layer 107 of the first tubular electrode 10 while enabling one connecting plate of the pair, i.e. the connecting plate 103, to be disposed at a second position of the first tubular electrode corresponding to that of another connecting plate of the pair, i.e. the connecting plate 104. Similarly, there are two pairs of connecting plates 111, 112, 113, 114 and another two pairs of connecting plates 121, 122, 123, 124 to be connected respectively to the second and the third tubular electrodes 11, 12 in the same way as that of the first tubular electrode 10. By the disposition of those connecting plates, the conductivity of the fuel cell's electrode structure 1 is improved. As the first tubular electrode 10 shown in FIG. 1C, the connecting plate 101 connected to the anode layer 105 is disposed at a first position of the first tubular electrode corresponding to that of the connecting plate 102 connected to the cathode layer 107 while another connecting plate 103 connected to the anode layer 105 is disposed at a first position of the first tubular electrode corresponding to that of the connecting plate 104 connected to the cathode layer 107, whereas the first position and the second position are symmetrically located on the periphery of the first tubular electrode 10 with respect to the center thereof, such that the path of current traveling inside the fuel cell is shortened. Please refer to FIG. 5, which is a schematic diagram depicting a traveling path of current generated by a solid oxide fuel cell of the present invention. The current 96 generated by the chemical reaction of the first tubular electrode 10 is traveling the path defined by the serial connection formed by the connecting plate 101, 102, 103, 104 so that the traveling path of the current 96 is shortened and thus the voltage loss can be decreased.

Figure 2A:
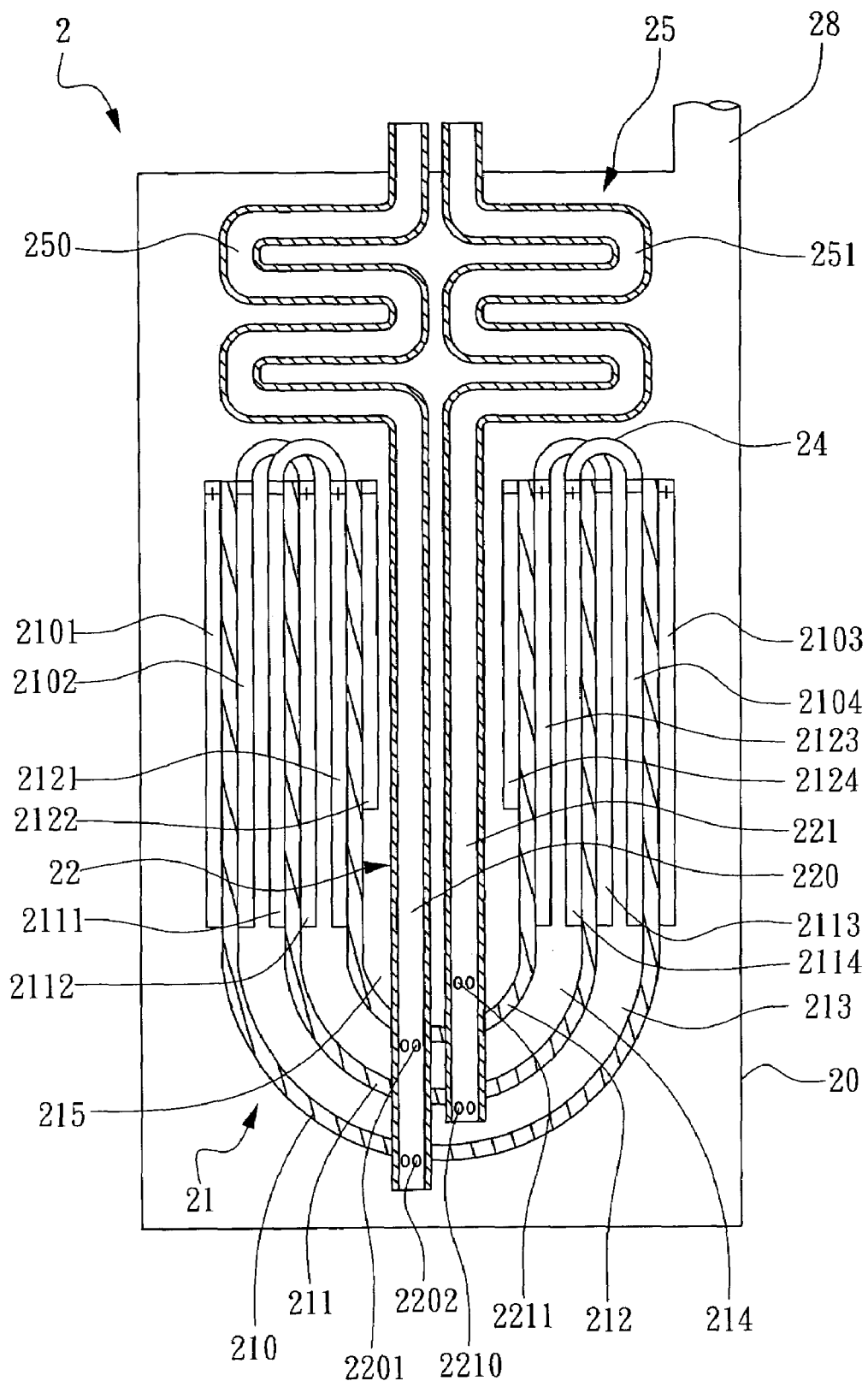
FIG. 2A is a sectional view of a solid oxide fuel cell of multiple tubular electrodes according to a preferred embodiment of the present invention.

Please refer to FIG. 2A, which is a sectional view of a solid oxide fuel cell of multiple tubular electrodes applying the electrode structure 1 of FIG. 1A. The fuel cell 2 of FIG. 2A is comprised of a housing 20, a power unit 21 and a reacting gases supplying means 22. The power unit 21 is composed of a first tubular electrode 210, a second tubular electrode 211 and a third tubular electrode 212, being concentrically arranged to form a plurality of reaction chambers therebetween while enabling the polarity of a surface of any one of the plural electrodes to be the same as that of the corresponding surface of a neighbor electrode faced thereto, each tubular electrode being comprised of an anode layer, a cathode layer, and a solid electrolyte layer sandwiched between the anode layer and the cathode layer. That is, a reaction chamber 213 is formed between the first tubular electrode 210 and the second tubular electrode 211; and a reaction chamber 214 is formed between the second tubular electrode 211 and the third tubular electrode 212; and the cathode layer of the first tubular electrode 210 is faced to the cathode layer of the second tubular electrode 211; and the anode layer of the second tubular electrode 211 is faced to the anode layer of the third tubular electrode 212. It is noted that the cathode layer of the third tubular electrode 212 is faced to the space 215 enclosed thereby.

The tubular electrodes 210, 211, 212 of the power unit 21, each is connected to two pair of connecting plates, that is, the connecting plates 2101, 2102, 2103, 2104 to the first tubular electrode 210, the connecting plates 2111, 2112, 2113, 2114 to the second tubular electrode 211, and the connecting plates 2121, 2122, 2123, 2124 to the third tubular electrode 212. In the preferred embodiment shown in FIG. 2A, the connecting plate 2102 connected to the cathode layer of the first tubular electrode 210 is connected to the connecting plate 2112 connected to the anode layer of the second tubular electrode 211 by a conductive piece 24; and the connecting plate 2104 connected to the cathode layer of the first tubular electrode 210 is connected to the connecting plate 2114 connected to the anode layer of the second tubular electrode 211 by a conductive piece 24; and the connecting plate 2111 connected to the cathode layer of the second tubular electrode 211 is connected to the connecting plate 2121 connected to the anode layer of the third tubular electrode 212 by a conductive piece 24; and the connecting plate 2113 connected to the cathode layer of the second tubular electrode 211 is connected to the connecting plate 2123 connected to the anode layer of the third tubular electrode 212 by a conductive piece 24. Hence, the electricity generated by the fuel cell 2 can be guided out by the use of connective wires connected respectively to the anode and the cathode of the fuel cell 2.

Figure 2B:
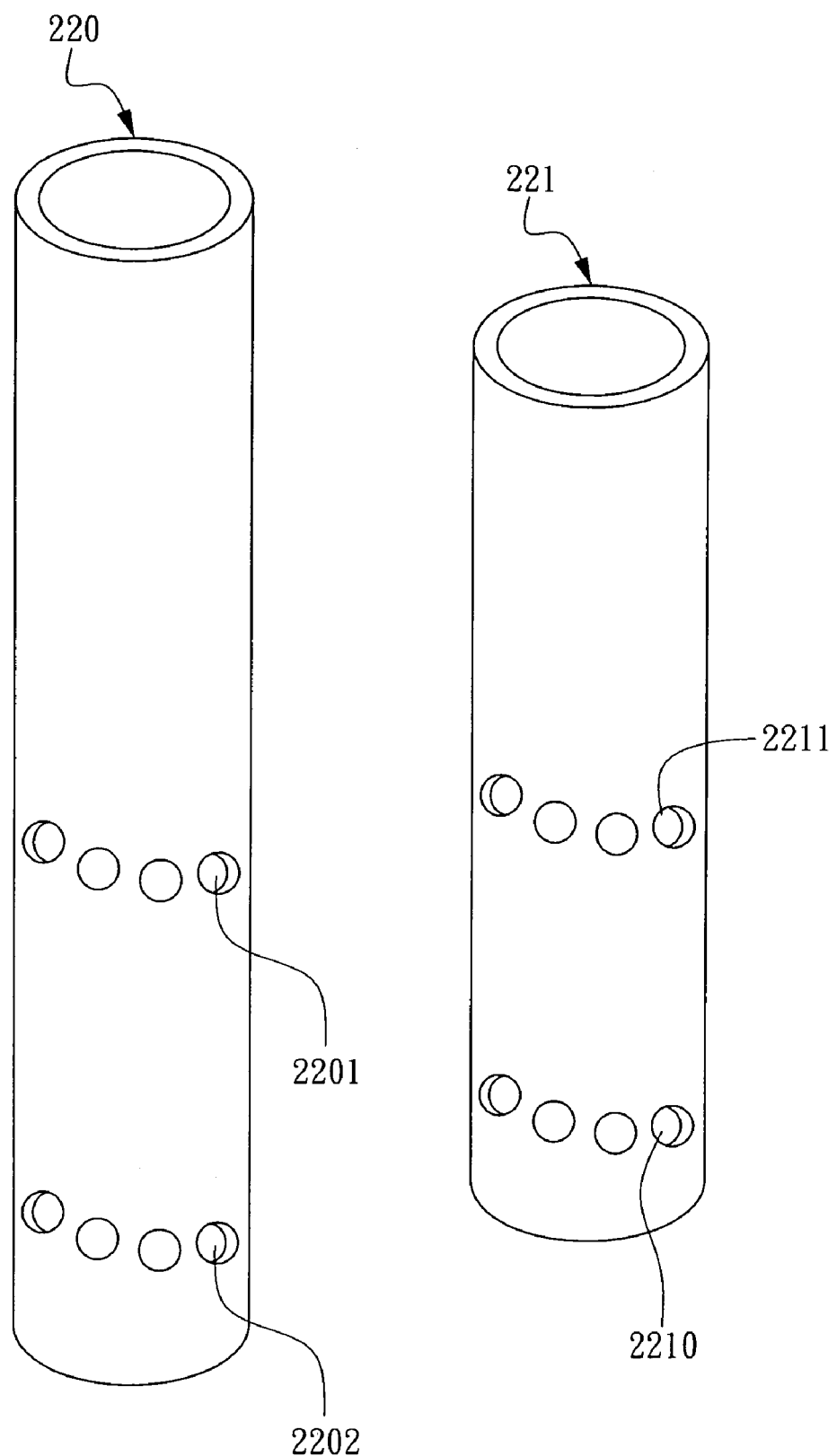
FIG. 2B is a 3-D schematic diagram showing a gas pipe and a fuel pipe of a solid oxide fuel cell of multiple tubular electrodes according to the present invention.

The reacting gases supplying means 22 is disposed inside the space 215 enclosed by the third tubular electrode 212 for providing a fuel and a gas respectively to the anode and cathode of each tubular electrode, which is comprised of a gas pipe 221 and a fuel pipe 220. As seen in FIG. 2A and FIG. 2B, the gas pipe 221, being arranged in the space 215, has holes 2210 arranged on the pipe wall thereof at a position corresponding to the space 215, and holes 2211 arranged on the pipe wall thereof at a position corresponding to the reaction chamber 213 for enabling the gas flowing therein to flow into the space 215 and the reaction chamber 213; and the fuel pipe 220, being arranged in the space 215, has holes 2201 arranged on the pipe wall thereof at a position corresponding to the reaction chamber 214, and holes 2202 arranged on the pipe wall thereof at a position corresponding to the space formed between the housing 20 and the first tubular electrode 210 for enabling the gas flowing therein to flow into the reaction chamber 214 and the space formed by the enclosure of the housing 20 and the first tubular electrode 210.

The reacting gases supplying means 22 is connected to a preheat piping 25, whereas the area of the preheat piping forms an after-burn area. The preheat piping 25 is comprised of a fuel preheat pipe 250, connected to the fuel pipe 220, and a gas preheat pipe 251, connected to the gas pipe 221. Since the excess fuel and gas, being referred as residual fuel and gas hereinafter, will move upwardly and enter into the area of the preheat piping 25 to be subjected to an high temperature ambient caused by the operation of the fuel cell 2, the residual fuel and gas will be ignited to burn and thus heat and exhaust are released. As the exhaust is discharged through a exhaust pipe, the heat is being transfer to the preheating piping 25 for heating up the fuel and gas flowing therein. In this preferred embodiment, the preheat piping 25 is a helical pipe, which can increase the path of the fuel and the gas as they are flowing inside the preheat piping 25 so as to increase the duration of preheating for achieving a better preheating effect.

Figure 3:
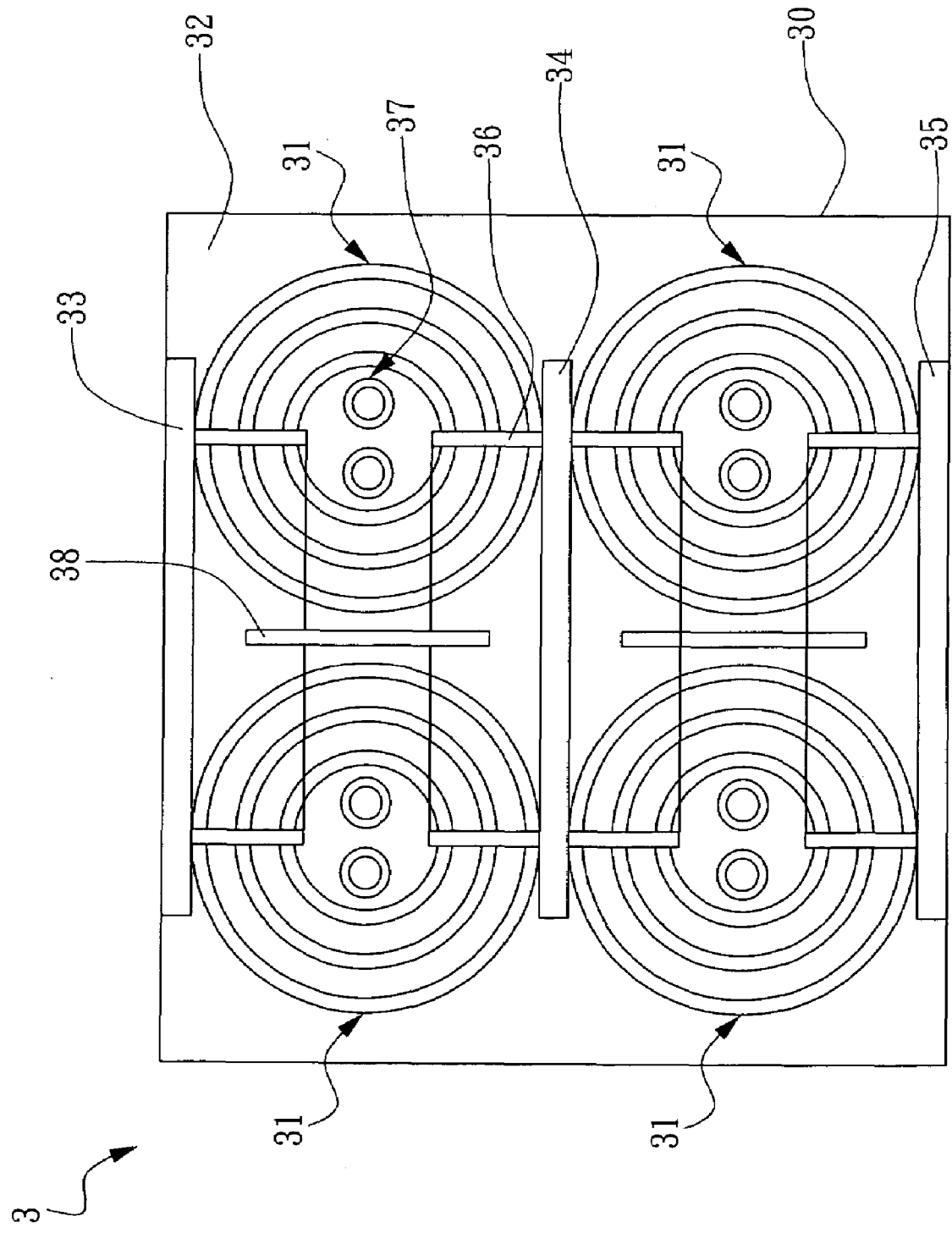
FIG. 3 is a top view of a solid oxide fuel cell module according to the present invention.

Please refer to FIG. 3, which is a top view of a solid oxide fuel cell module according to the present invention. The fuel cell module 3 is formed by combining a plurality of the power generating units 31 that the modularized design enables the fuel cell module 3 to incorporate any amount of power generating units 31 therein with flexible formation while enabling each power generating units 31 of the fuel cell module 3 to be maintained and replaced with ease. In a preferred embodiment shown in FIG. 3, the fuel cell module 3 is comprises of: a hull 30; four power generating units 31, being arranged inside the hull 30; a reacting gases supplying means 37; and three first current collectors 33, 34, 35. The configuration of each power generating unit 31 and the reacting gases supplying means 37 is the same as the power unit 21 and the reacting gases supplying means 22 shown in FIG. 2A and thus are not described further herein.

In this preferred embodiment, the first current collector 33 is placed against a side wall of the hull 30 and the first current collector 35 is placed against another side wall opposite to that of the first current collector 33, while the first current collector 34 is place at the middle of the foregoing two first current collectors 33, 35, i.e. at the middle of the hull 30. Thereafter, the four power generating units 31 is to be placed and inset into the spaces separated and formed inside the hull 30 by the arrangement of the three first current collectors 33, 34, 35 while enabling each of the three first current collectors 33, 34, 35 to abut against each of the power generating units 31 so as to fix the same and conduct current therefrom. In this preferred embodiment, the outer most layer of each power generating unit 31 is an anode layer so that the polarities of the three first current collectors 3, 34, 35 are all anode.

In addition, there are a plurality of second current collector 38, each being placed between any of the two power generating units 31 selected out of the four power generating units 31 of the fuel cell module 3. It is noted that the polarity of each second current collector 38 is enabled to be cathode and is electrically connected to the cathode layer of the power generating units 31 corresponding thereto by conductive pieces 36, which is formed of connecting plates in this preferred embodiment. By the cooperation of the first current collectors 33, 34, 35 and the second current collectors 38, the electricity generated by the power generating units 31 can be guided out of the fuel cell module 3. It is noted that the amount of power generating units 31 being incorporated in the fuel cell module 3 is not limited by the four power generating units 31 shown in this preferred embodiment and can be increase/decrease as required. Moreover, it is able to connect more than two fuel cell modules 3 in serial for increasing the overall voltage output. Furthermore, the polarities of the first and the second current collectors are not limited by those shown in this preferred embodiment and thus can be assigned according to the configuration of the first tubular electrode, that is, the polarity of the first current collector is defined to be cathode and the polarity of the second current collector is defined to be anode when the outer most layer of the first tubular electrode is a cathode layer, and vice versa. The structure of the preheat piping in the fuel cell module 3 is the same as that shown in FIG. 2A and this is not described further herein.

Figure 4:
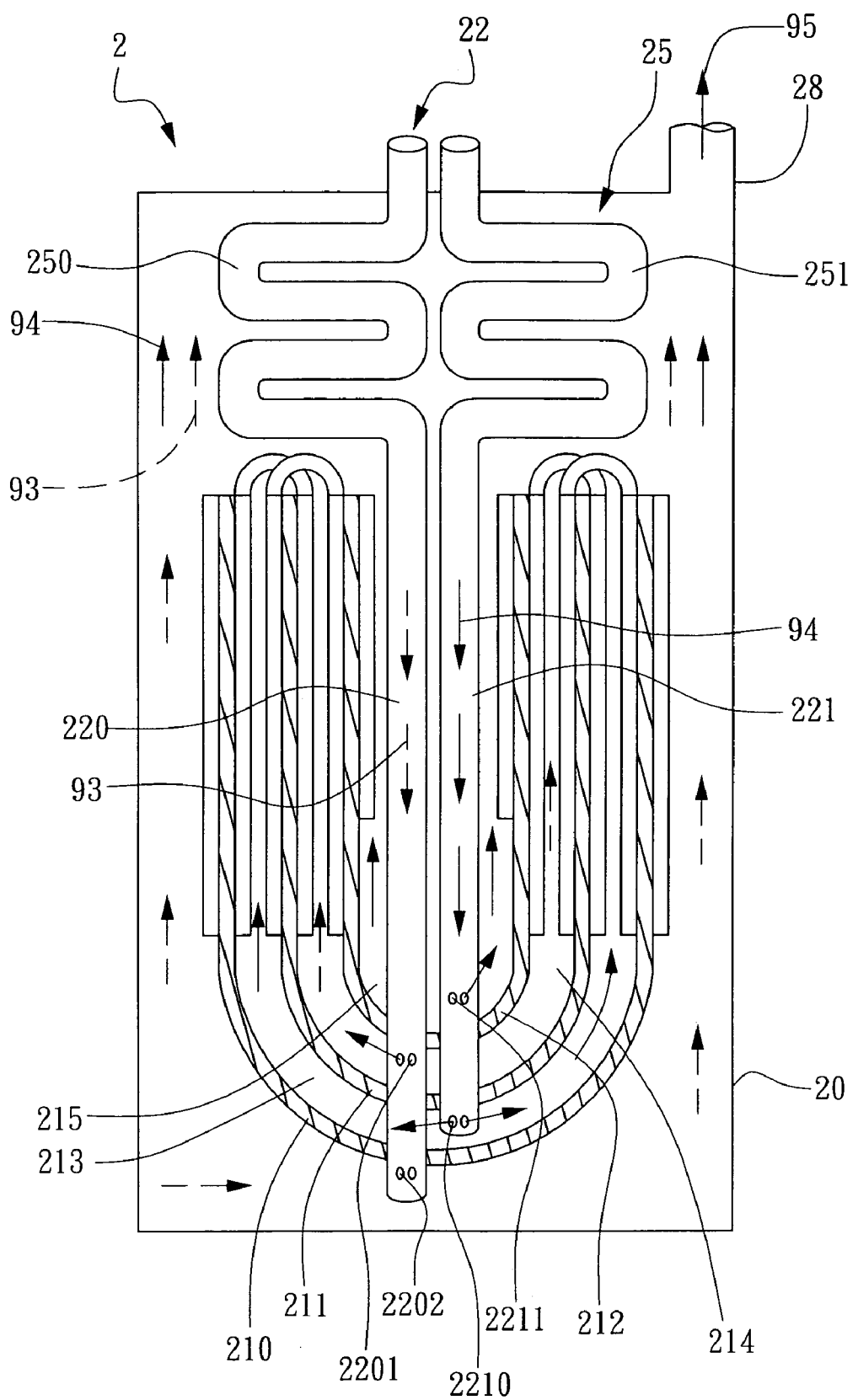
FIG. 4 is a schematic diagram depicting an operating solid oxide fuel cell according to a preferred embodiment of the present invention.

Please refer to FIG. 4, which is a schematic diagram depicting an operating solid oxide fuel cell according to a preferred embodiment of the present invention. In FIG. 4, the first, the second and the third tubular electrodes 210, 211, 212 are concentrically arranged while enabling the polarity of a surface of any one of the plural electrodes to be the same as that of the corresponding surface of a neighbor electrode faced thereto. In addition each tubular electrode being comprised of an anode layer, a cathode layer, and a solid electrolyte layer sandwiched between the anode layer and the cathode layer, wherein as the outer most layer of the first tubular electrode 210 is an anode layer, a reaction chamber 213 is formed between the cathode layer of the first tubular electrode 210 and the cathode layer of the second tubular electrode 211 while another reaction chamber 214 is formed between the anode layer of the second tubular electrode 211 and the anode layer of the third tubular electrode 212, and thus the space 215 is formed by the enclosure of the cathode layer of the third tubular electrode 212.

Since the outer most layer of the first tubular electrode 210 is the anode layer thereof, the outer surface of the first tubular electrode 210 will be enabled to contact with high-temperature fuel 93 such as hydrogen, methane, etc., and fuel 93 is also being fed into the reaction chamber 214 through the holes 2201 arranged on the wall of the fuel pipe 220 and the space enclosed between the housing 20 and the first tubular electrode 210 through the holes 2202 arranged on the wall of the fuel pipe 220, while the gas pipe 221, being arranged in the space 215, has holes 2210 arranged on the pipe wall thereof at a position corresponding to the space 215, and holes 2211 arranged on the pipe wall thereof at a position corresponding to the reaction chamber 213 for enabling the gas 94 flowing therein to flow into the space 215 and the reaction chamber 213. Operationally, when an oxygen molecule contacts the cathode/electrolyte interface as the air flows along the cathode (which is therefore also called the "air electrode"), it catalytically acquires four electrons from the cathode and splits into two oxygen ions. The oxygen ions diffuse into the electrolyte material and migrate to the other side of the cell where they encounter the anode (also called the "fuel electrode"). The oxygen ions encounter the fuel at the anode/electrolyte interface and react catalytically, giving off water, carbon dioxide, heat, and—most importantly—electrons. The electrons transport through the anode to the external circuit and back to the cathode, providing a source of useful electrical energy in an external circuit. Furthermore, the exhaust air 94 and residual fuel 93 are recycled by the preheating piping 25 where they are ignited to burn to preheat the reacting gases supplying means 22 while the exhaust generated by the burn of residual fuel is discharged through an exhaust pipe 28.

To sum up, the concentric electrode structure of the invention is not only compact and space saving, but also is capable of reducing voltage loss by shortening the path of current traveling therein, so that the efficiency per unit volume of the fuel cell adopting the same is enhanced. Moreover, by employing the referring fuel cell as one power generating unit, a fuel cell module can be formed by combining a plurality of the power generating units that the modularized design enables the fuel cell module to incorporate any amount of fuel cells therein with flexible formation while enabling each fuel cell of the fuel cell module to be maintained and replaced with ease.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A solid oxide fuel cell, comprising:
   a plurality of tubular electrodes, being concentrically arranged to form a plurality of reaction chambers therebetween while enabling the polarity of a surface of any one of the plural electrodes to be the same as that of the corresponding surface of a neighbor electrode faced thereto, each tubular electrode being comprised of an anode layer, a cathode layer, and a solid electrolyte layer sandwiched between the anode layer and the cathode layer;
   a reacting gases supplying means, capable of supplying a fuel and a gas respectively to the anode and cathode of each tubular electrode, wherein the reacting gases supplying means further comprises:
      a gas pipe, being arranged in the space enclosed by the inner most tubular electrode of the plural concentric-arranged tubular electrodes and passing through the inner most tubular electrode, having at least a hole arranged on the pipe wall thereof at a position corresponding to each reaction chamber formed between two cathode layers respectively of two adjacent tubular electrodes for enabling the gas flowing therein to flow into the referring reaction chamber by way of each corresponding hole, wherein said gas pipe is consisted of a single gas pipe; and
      a fuel pipe, being arranged in the space enclosed by the inner most tubular electrode of the plural concentric-arranged tubular electrodes and passing through the inner most tubular electrode, having at least a hole arranged on the pipe wall thereof at a position corresponding to each reaction chamber formed between two anode layers respectively of two adjacent tubular electrodes for enabling the fuel flowing therein to flow into the referring reaction chamber by way of each corresponding hole, wherein said fuel pipe is consisted of a single fuel pipe; and
   a preheat piping, connected to the reacting gases supplying means, for collecting the heat generated from the combustion reaction of residual fuel and gas to preheat the fuel and gas inside the reacting gases supplying means.

2. The fuel cell of claim 1, wherein the gas is a material selected from the group consisting of air and oxygen.

3. The fuel cell of claim 1, wherein the fuel is a material selected from the group consisting of hydrogen and methane.

4. The fuel cell of claim 1, wherein each tubular electrode further comprises at least a pair of connecting plates, respectively connected to the cathode layer and the anode layer of the referring tubular electrode while enabling one connecting plate of the pair to be disposed at a place of the referring tubular electrode corresponding to that of another connecting plate of the pair.

5. The fuel cell of claim 1, wherein each tubular electrode further comprises two pairs of connecting plates, wherein the two connecting plates of one pair out of the two pairs are respectively connected to the cathode layer and the anode layer of the referring tubular electrode while enabling one connecting plate of the pair to be disposed at a first position of the referring tubular electrode corresponding to that of another connecting plate of the pair; and the two connecting plates of another pair are respectively connected to the cathode layer and the anode layer of the referring tubular electrode while enabling one connecting plate of the pair to be disposed at a second position of the referring tubular electrode corresponding to that of another connecting plate of the pair.

6. The fuel cell of claim 1, further comprising an exhaust pipe for discharging the exhaust generated by the combustion reaction of the fuel cell.

7. The fuel cell of claim 1, wherein the preheat piping is a helical pipe.

8. A fuel cell module, comprising:
   a plurality of power generating units, being arranged inside a hull, each power generating unit further comprising:
      a plurality of tubular electrodes, being concentrically arranged in a housing of the referring power generating unit to form a plurality of reaction chambers therebetween while enabling the polarity of a surface of any one of the plural electrodes to be the same as that of the corresponding surface of a neighbor electrode faced thereto, each tubular electrode being comprised of an anode layer, a cathode layer, and a solid electrolyte layer sandwiched between the anode layer and the cathode layer; and
      a reacting gases supplying means, capable of supplying a fuel and a gas respectively to the anode and cathode of each tubular electrodes, wherein the reacting gases supplying means further comprises:
         a gas pipe, being arranged in the space enclosed by the inner most tubular electrode of the plural concentric-arranged tubular electrodes and passing through the inner most tubular electrode, having at least a hole arranged on the pipe wall thereof at a position corresponding to each reaction chamber formed between two cathode layers respectively of two adjacent tubular electrodes for enabling the gas flowing therein to flow into the referring reaction chamber by way of each corresponding hole, wherein said gas pipe is consisted of a single gas pipe; and
         a fuel pipe, being arranged in the space enclosed by the inner most tubular electrode of the plural concentric-arranged tubular electrodes and passing through the inner most tubular electrode, having at least a hole arranged on the pipe wall thereof at a position corresponding to each reaction chamber formed between two anode layers respectively of two adjacent tubular electrodes for enabling the fuel flowing therein to flow into the referring reaction chamber by way of each corresponding hole, wherein said fuel pipe is consisted of a single fuel pipe;
   at least two first current collectors, being arranged inside the hull for fixing the plural power generating units; and
   a plurality of preheat pipings, respectively connected to the reacting gases supplying means of each power generating unit for collecting the heat generated from the combustion reaction of residual fuel and gas to preheat the fuel and gas inside the corresponding reacting gases supplying means.

9. The fuel cell module of claim 8, wherein the gas is a material selected from the group consisting of air and oxygen.

10. The fuel cell module of claim 8, wherein the fuel is a material selected from the group consisting of hydrogen and methane.

11. The fuel cell module of claim 8, wherein each tubular electrode further comprises at least a pair of connecting plates, respectively connected to the cathode layer and the anode layer of the referring tubular electrode while enabling one connecting plate of the pair to be disposed at a place of the referring tubular electrode corresponding to that of another connecting plate of the pair.

12. The fuel cell module of claim 8, wherein each tubular electrode further comprises two pairs of connecting plates, wherein the two connecting plates of one pair out of the two pairs are respectively connected to the cathode layer and the anode layer of the referring tubular electrode while enabling one connecting plate of the pair to be disposed at a first position of the referring tubular electrode corresponding to that of another connecting plate of the pair; and the two connecting plates of another pair are respectively connected to the cathode layer and the anode layer of the referring tubular electrode while enabling one connecting plate of the pair to be disposed at a second position of the referring tubular electrode corresponding to that of another connecting plate of the pair.

13. The fuel cell module of claim 8, wherein each first current collector is an anode plate.

14. The fuel cell module of claim 13, wherein further comprises at least a second current collector, each being arranged inside the hull while electrically connecting to the cathode layer of each tubular electrode.

15. The fuel cell module of claim 8, wherein each first current collector is a cathode plate.

16. The fuel cell module of claim 15, wherein further comprises at least a second current collector, each being arranged inside the hull while electrically connecting to the anode layer of each tubular electrode.

17. The fuel cell module of claim 8, wherein further comprising an exhaust pipe for discharging the exhaust generated by the combustion reaction of the fuel cell.

18. The fuel cell module of claim 8, wherein the preheat piping is a helical pipe.

* * * * *